United States Patent
Crawford et al.

[11] Patent Number: 5,970,113
[45] Date of Patent: Oct. 19, 1999

[54] COMPUTED TOMOGRAPHY SCANNING APPARATUS AND METHOD WITH TEMPERATURE COMPENSATION FOR DARK CURRENT OFFSETS

[75] Inventors: Carl R. Crawford, Brookline; Hans J. Weedon, Salem; Christopher C. Ruth, Danvers, all of Mass.

[73] Assignee: Analogic Corporation, Peabody, Mass.

[21] Appl. No.: 08/948,928

[22] Filed: Oct. 10, 1997

[51] Int. Cl.⁶ ........................................ G01N 23/00
[52] U.S. Cl. .......................... 378/19; 378/4; 250/370.09
[58] Field of Search ............... 378/98.8, 19; 250/370.09

[56] References Cited

U.S. PATENT DOCUMENTS

| | | | |
|---|---|---|---|
| 5,390,111 | 2/1995 | Tam | 364/413.3 |
| 5,390,226 | 2/1995 | Tam | 378/19 |
| 5,444,752 | 8/1995 | Dobbs et al. | 378/19 |
| 5,600,700 | 2/1997 | Krug et al. | 378/57 |
| 5,644,610 | 7/1997 | Crawford et al. | 378/19 |
| 5,661,293 | 8/1997 | Ziegler et al. | 250/214 |

*Primary Examiner*—Craig E. Church
*Attorney, Agent, or Firm*—Lappin & Kusmer LLP

[57] ABSTRACT

A method and apparatus for performing CT scans of baggage being carried or loaded onto commercial aircraft are described. The CT baggage scanner of the invention includes numerous features which provide the system with high baggage throughput on the order of seven hundred bags per hour as well as improved image quality and accurate target detection. In one aspect, the scanner includes an adaptive image reconstruction window which identifies data collected from the field of view that are not related to the baggage being scanned. These unrelated data are excluded from the image reconstruction process, resulting in greatly reduced reconstruction time and increased baggage throughput. The invention also includes the capability of performing calibration "air scans" with objects such as the system conveyor in the field of view. Data gathered during the calibration scan are applied to a threshold, and data exceeding the threshold are assumed to be from X-rays that are unobstructed by objects in the field of view and are therefore used to perform the air calibration. The baggage scanner can also analyze scan data to identify shapes of objects, particularly, objects formed in the shape of a sheet. This greatly improves the ability of the system to detect sheet explosives. The system also compensates for detector dark currents and provides dark current offsets which can be dependent upon detector temperature.

12 Claims, 9 Drawing Sheets

COMPUTED TOMOGRAPHY SCANNING APPARATUS AND METHOD WITH TEMPERATURE COMPENSATION FOR DARK CURRENT OFFSETS

RELATED APPLICATION

This application is related to copending U.S. application Ser. No.08/831,558, filed on Apr. 9, 1997, (Attorney Docket No. ANA-118) of common assignee, the contents of which are incorporated herein in their entirety by reference.

This application is related to the following U.S. applications filed on even date herewith, of common assignee, the contents of which are incorporated herein in their entirety by reference:

"Computed Tomography Scanner Drive System and Bearing," invented by Andrew P. Tybinkowski, et al., (Attorney Docket No. ANA-128);

"Air Calibration Scan for Computed Tomography Scanner with Obstructing Objects," invented by David A. Schafer, et al., (Attorney Docket No. ANA-129);

"Computed Tomography Scanning Target Detection Using Non-Parallel Slices,"invented by Christopher C. Ruth, et al., (Attorney Docket No. ANA-132);

"Computed Tomography Scanning Target Detection Using Target Surface Normals," invented by Christopher C. Ruth, et al., (Attorney Docket No. ANA-133);

"Parallel Processing Architecture for Computed Tomography Scanning System Using Non-Parallel Slices," invented by Christopher C. Ruth, et al., (Attorney Docket No. ANA-134);

"Computed Tomography Scanning Apparatus and Method For Generating Parallel Projections Using Non-Parallel Slice Data," invented by Christopher C. Ruth, et al., (Attorney Docket No. ANA-135);

"Computed Tomography Scanning Apparatus and Method Using Adaptive Reconstruction Window," invented by Bernard M. Gordon, et al., (Attorney Docket No. ANA-136);

"Area Detector Array for Computed Tomography Scanning System," invented by David A Schafer, et al., (Attorney Docket No. ANA-137);

"Closed Loop Air Conditioning System for a Computed Tomography Scanner,"invented by Eric Bailey, et al., (Attorney Docket No. ANA-138);

"Measurement and Control System for Controlling System Functions as a Function of Rotational Parameters of a Rotating Device," invented by Geoffrey A. Legg, et al., (Attorney Docket No. ANA-139);

"Rotary Energy Shield for Computed Tomography Scanner," invented by Andrew P. Tybinkowski, et al., (Attorney Docket No. ANA-144).

FIELD OF THE INVENTION

The present invention relates generally to computed tomography (CT) scanners and more specifically to a baggage scanning system which utilizes CT technology.

BACKGROUND OF THE INVENTION

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Techniques using dual energy X-ray sources are known for providing additional information about a material's chemical characteristics, beyond solely a density measurement. Techniques using dual energy X-ray sources involve measuring the X-ray absorption characteristics of a material for two different energy levels of X-rays. These measurements provide an indication of the material's atomic number in addition to an indication of the material's density. Dual energy X-ray techniques for energy-selective reconstruction of X-ray CT images are described, for example, in Alvarez, Robin et al., "Energy-selective Reconstructions in X-ray Computerized Tomography", *Phys. Med. Biol.* 1976, Vol. 21, No. 5, 733–744; and U.S. Pat. No. 5,132,998.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in copending U.S. patent application Ser. No. 08/671,202, entitled "Improved Dual Energy Power Supply," (Attorney Docket No. ANA-094) which is assigned to the same assignee as the present invention and which is incorporated herein in its entirety by reference.

Plastic explosives present a particular challenge to baggage scanning systems because, due to their moldable nature, plastic explosives may be formed into geometric shapes that are difficult to detect. Most explosives capable of significantly damaging an aircraft weigh at least a pound and are sufficiently large in length, width, and height so as to be readily detectable by an X-ray scanner system regardless of the explosive's orientation within the baggage. However, a plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Thus, detection of suspected baggage requires very attentive operators. The requirement for such attentiveness can result in greater operator fatigue, and fatigue as well as any distractions can result in a suspected bag passing through the system undetected.

Accordingly, a great deal of effort has been made to design a better baggage scanner. Such designs, for example, have been described in U.S. Pat. Nos. 4,759,047 (Donges et al.); 4,884,289 (Glockmann et al.); 5,132,988 (Tsutsui et al.); 5,182,764 (Peschmann et al.); 5,247,561 (Kotowski); 5,319,547 (Krug et al.); 5,367,552 (Peschmann et al.); 5,490,218 (Krug et al.) and German Offenlegungsschrift DE 31 503 06 A1 (Heimann GmbH).

At least one of these designs, described in U.S. Patent Nos. 5,182,764 (Peschmann et al.) and 5,367,552 (Peschmann et al.) (hereinafter the '764 and '552 patents), has been commercially developed and is referred to hereinafter as the "Invision Machine." The Invision Machine includes a CT scanner of the third generation type, which typically include an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is relatively thin in that direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from a point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner.

One important design criterion for a baggage scanner is the speed with which the scanner can scan an item of baggage. To be of practical utility in any major airport, a baggage scanner should be capable of scanning a large number of bags at a very fast rate, e.g., on the order of seven hundred of bags per hour or faster, and to provide this rate the scanner must scan an average sized bag at a rate of about 5 seconds per bag or less. For this reason one problem with the Invision Machine is that CT scanners of the type described in the '764 and '552 patents take a relatively long time, e.g., from about 0.6 to about 2.0 seconds for one revolution of the disk, to generate the data for a single sliced CT image. Further, the thinner the slice of the beam through the bag for each image the better the resolution of the image, so the CT scanner should provide images of sufficient resolution to detect plastic explosives on the order of only a few millimeters thick. If 0.6 to 2.0 seconds are required for generation of data for each sliced CT image, and the average bag can be assumed to be about 70 cm long, at the desired throughput rate of 700 bags per hour a conventional CT baggage scanner can only afford to generate an average of two or three CT images per bag since the bag must be moved and stopped at each location of a scan. Clearly, one cannot scan the entire bag within the time allotted for a reasonably fast throughput. Generating only two or three CT images per baggage item leaves most of the item unscanned and therefore does not provide adequate or complete scanning.

SUMMARY OF THE INVENTION

The present invention is directed to a baggage scanning system which substantially overcomes the drawbacks of the prior art. The baggage scanning system of the invention is capable of scanning on the order of seven hundred bags per hour without the need for operator intervention as the baggage is transported through the scanner.

In one aspect, the present invention is directed to an apparatus and method in a CT scanner which greatly improve scanner throughput by adapting the data reconstruction window of the scanner to the size of each object, e.g., piece of baggage, being scanned. In this aspect, the invention tailors the reconstruction window, which defines the number of pixels to be reconstructed from scan data to generate an image, to the size and location of the bag within the field of view of the scanner. The CT machine scans the field of view to generate the scan data for the object passing through the scanner. The size of the object and its location within the field of view are determined. Using the size and location of the object, two portions of pixels in the field of view are identified. The first portion of pixels is reconstructed to generate an image of the object, and the second identified portion of pixels is not reconstructed.

Hence, in this aspect of the invention, only pixels that provide information related to the bag being scanned, i.e., the first portion of pixels, are processed during image reconstruction. Pixels that are not related to the bag, i.e., the second portion of pixels, are not reconstructed. Unrelated pixels can include those in the area below the bag conveyor system and in the areas next to and above the bag. By effectively discarding pixels that provide no information related to the bag, the processing load during reconstruction is substantially reduced, resulting in shorter reconstruction time and higher bag scanning throughput.

In one embodiment, the size and location of the bag within the field of view are determined by detecting the boundaries of the bag. This can be done by analyzing the scan data to locate object boundaries in the data using boundary location processes known in the art. In one embodiment, parallel projection data can be analyzed to locate the boundaries. In an alternative embodiment, the scanner includes a separate sensor used to detect the bag boundaries. The sensor can be an acoustic sensor such as a high-frequency ultrasound range finder, or it can be an optical sensor, which can include one or more optical devices such as lasers, light emitting diodes, or infrared detectors. Any of these approaches return data which indicate the boundaries of the bag, which can be used to indicate the center of the bag and, therefore, its location within the scanner field of view.

In one embodiment, the pixels identified as being unrelated to the bag are not reconstructed, and all pixels related to the bag are reconstructed to generate a complete image of the bag. This approach provides a complete image of every bag regardless of its size, and enjoys improved scanner throughput. However, because of the wide variation in bag sizes, the processing load and, therefore, the bag throughput are difficult to monitor and control. There may exist scenarios in which bag throughput could be reduced, such as where the scanner processes a large number of unusually large bags consecutively. Therefore, in an alternative embodiment, an upper limit is set on the overall size of the reconstruction window. This can be done by setting a maximum number of pixels to be reconstructed. This maximum pixel window can then be fit within the determined size, location and dimensions of the bag to produce the best possible image of the bag within the preset pixel reconstruction limit. This approach produces a useful image of the bag while ensuring that the bag scanning throughput remains at a controllable level.

By omitting pixels unrelated to the bag being analyzed from the image reconstruction process, the adaptive reconstruction window of the invention provides significant advantages. For example, significant unnecessary data processing is eliminated, resulting in shorter reconstruction time and increased bag throughput in accordance with the bag throughput required at busy commercial airports.

In another aspect, the invention is directed to a system and method for performing calibration or "air" scans in a CT system to calibrate the system for variations in individual detector responses. Because it is generally difficult to remove obstructions, such as the conveyor system, from the field of view of the baggage scanner, air scans cannot readily be performed in the same manner that air scans are performed on conventional CT machines. The scanner of the invention performs air calibration scans while compensating for obstructions present in the field of view.

In one embodiment, the calibration is performed by first performing a scan of the field of view and acquiring a full set of data with obstructions present in the field of view. A calibration threshold is set, and for each detector, view data that exceed the threshold are selected to be used in computing the calibration offset value for the detector. Values below the threshold are discarded. In one embodiment, the threshold is set high enough such that it can be concluded that any data values that exceed the threshold are for radiation rays that do not pass through obstructions in the field of view and, therefore, can appropriately be used for the air calibration. For each detector, the selected data values from the unobstructed views are used to compute an air calibration value for the detector. In one embodiment, the selected values are averaged to compute the air calibration value. The air calibration value is then used as a normalization during subsequent scans of actual objects to compensate for response variations from detector to detector.

By applying the air scan calibration data to a threshold, data associated with unobstructed ray paths are identified. This allows air calibration to be performed without removing obstructions from the field of view. This is very important in the baggage scanner in which scans are performed continuously, and, as a result, it would be extremely inconvenient to remove obstructions such as the conveyor from the field of view to perform an air scan between bags. However, this approach can also be advantageous in the medical CT field. While it is somewhat more convenient to remove a patient table from a medical CT scanning machine than it is to remove the conveyor from the baggage scanner, performing medical CT air scans without the requirement of removing the patient table would be a significant improvement in medical CT. Hence, the air calibration of the invention also provides advantages in the medical CT field.

In another aspect, the invention is directed to a method and apparatus for identifying a target object such as a sheet from CT image data of an object in three-dimensional space. It is well known that plastic explosives can be molded into the shape of a sheet. Such sheet explosives can be difficult to detect using conventional CT techniques since the thickness of a sheet of explosives can be smaller than the resolution of a conventional CT scanner. In the present invention, image data for an object can be analyzed to determine if the object is in the form of a sheet and, therefore, could possibly be a plastic explosive.

In the apparatus and method of the invention, an object can be analyzed to determine if it is a sheet by analyzing image data near the surface of the object. The object to be analyzed is defined in three-dimensional space by its boundaries or surface. At each of many points along the surface of the object, a surface normal is computed and projected back into the object. At a plurality of points along the line projected back from the surface normal, an object density is obtained form the CT data for the object. Interpolation can be used to compute data for each point. A maximum distance into the object is set, and densities are generated up to the maximum distance. The maximum distance is chosen to be larger than the maximum expected sheet thickness.

For each normal line, after all densities are generated, a distance into the object at which the density rolls off is generated. In general, if the density rolls off at a distance less than the maximum distance, the density measurements may indicate the presence of a thin object which may be a sheet. Where no appreciable roll-off occurs up to the maximum distance, an object thicker than a sheet is indicated.

The computed roll-off distances can be compiled in a distribution such as a histogram. The histogram can then be analyzed to determine the shape of the object. A peak in the histogram at a roll-off distance less than the maximum distance can indicate a substantial portion of the object having a thickness at that roll-off distance. This can be used to indicate a sheet. A high peak in the histogram at the maximum distance can indicate a substantial portion of the object having a thickness larger than the expected thickness of a sheet. This can be used to indicate that the object is not a sheet.

The use of surface normals and histograms to identify a sheet-shaped object provides advantages over other approaches to identify sheets. For example, in one prior approach, an object's shape is analyzed by computing the ratio of its surface area to its volume. A high ratio is used to indicate a thin object such as a sheet. However, this approach is not very precise in that it only computes a single number for an entire object, with that number being susceptible to interpretation. Some objects with large surface areas but relatively small volumes could be erroneously indicated as being sheet-shaped. In contrast, the present invention allows for analysis at points around the entire object. By analyzing a statistical distribution of thicknesses over the entire object, a more precise conclusion as to the object's shape is obtained.

In another aspect, the invention is directed to an apparatus and method for providing compensation for "dark currents" in a CT system, i.e., currents generated by the detectors in the absence of x-rays, and specifically for compensating for variations in detector dark currents with temperature. In accordance with the invention, a calibration procedure is performed to characterize the variation in the dark currents with temperature. Using this variation, a set of detector offsets is generated. Each offset defines the dark current or offset current for a particular temperature. In one embodiment, a set of offsets is generated for each detector. In another embodiment, one set of offsets is used for all detectors. During subsequent actual scanning of an object or region, the offsets are used to adjust the data signals generated by the detectors. The temperature of the detectors is sensed while the region is scanned. For each detector, the offset associated with the presently sensed temperature is applied to the signal generated by the detector to adjust the object density sensed by the detector and thereby compensate for the detector's dark current over temperature.

In one embodiment, the variation in temperature is characterized during calibration by fitting the offset-versus-temperature data points to a set of parametric equations. In one embodiment, the variation is described by a Taylor series polynomial with constant coefficients. The coefficients can be derived by applying least squares error analysis.

By applying temperature dependent offsets to the detector data, the baggage scanning system of the invention provides more accurate dark current compensation than prior systems. In the baggage scanning environment, temperature effects are more substantial than they are in medical settings, since the baggage scanning system runs continuously in most cases. Therefore, the temperature dependency of the offsets becomes important to maintaining the quality of images created and, consequently, the ability of the system to detect target items. The temperature dependent offsets of the invention therefore provide a more accurate CT baggage scanner.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE DRAWINGS

Figure 1:
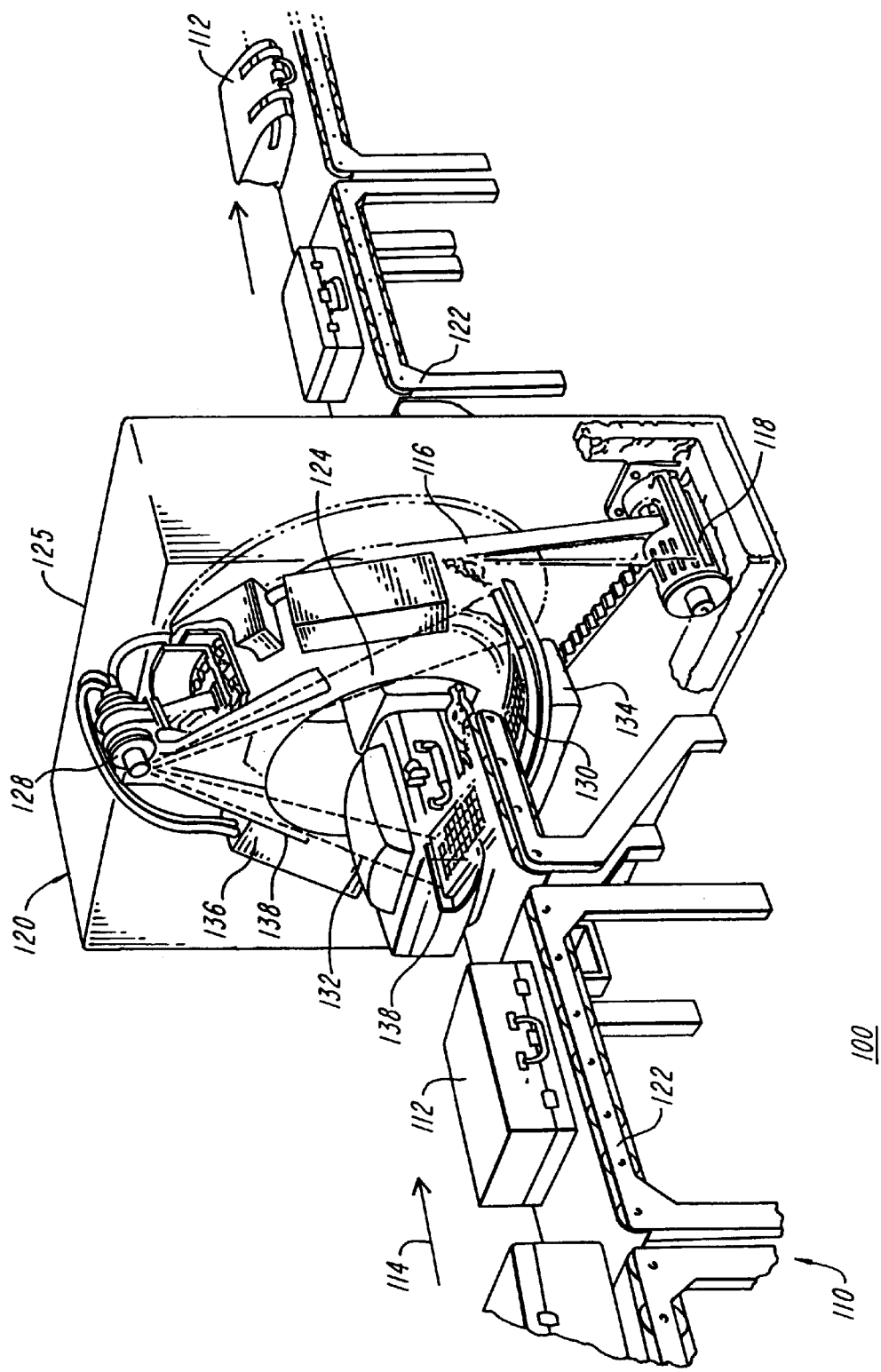
FIG. 1 contains a perspective view of a baggage scanning system in accordance with the present invention.
Figure 2:
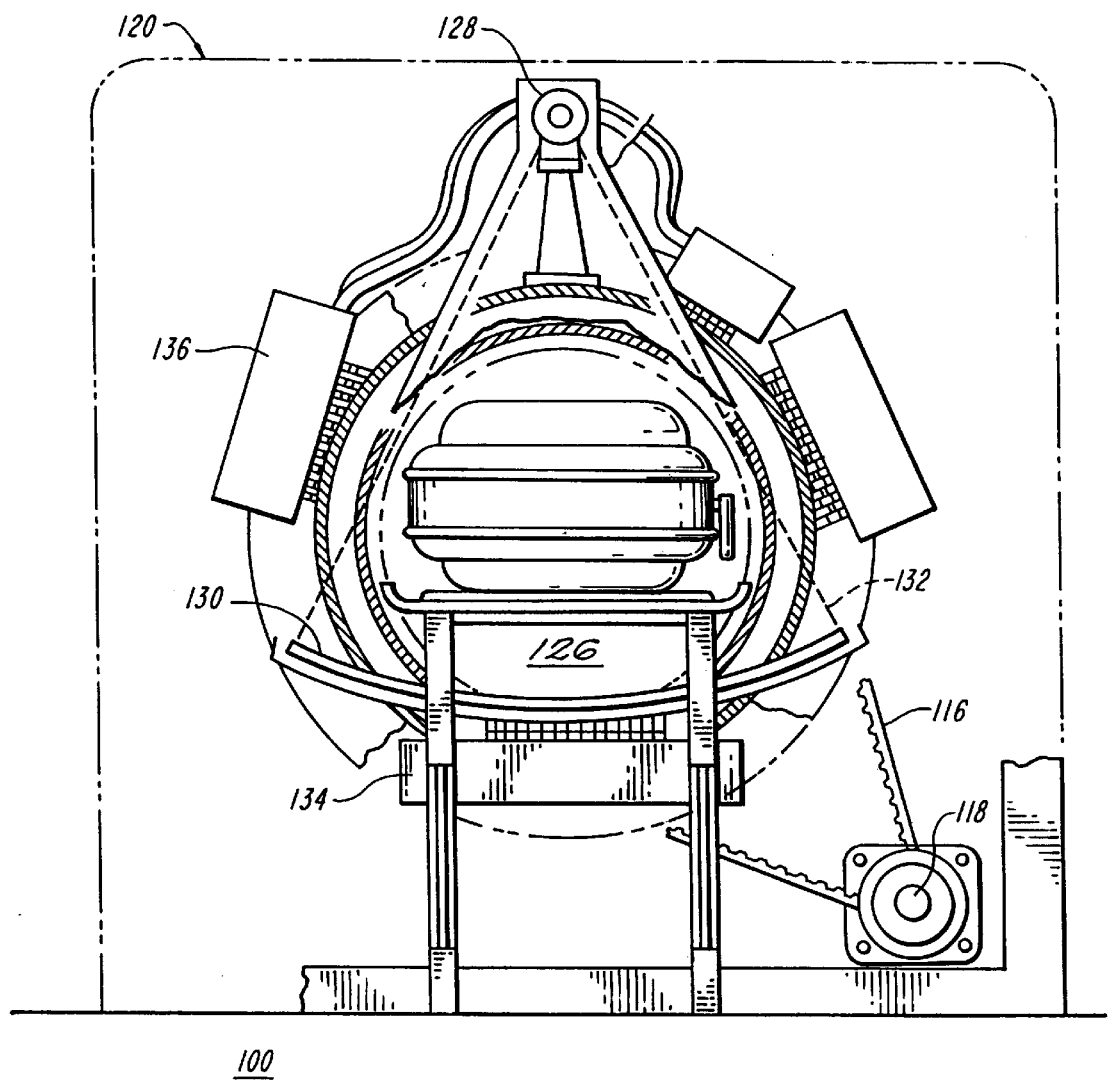
FIG. 2 contains a cross-sectional end view of the system shown in FIG. 1.
Figure 3:
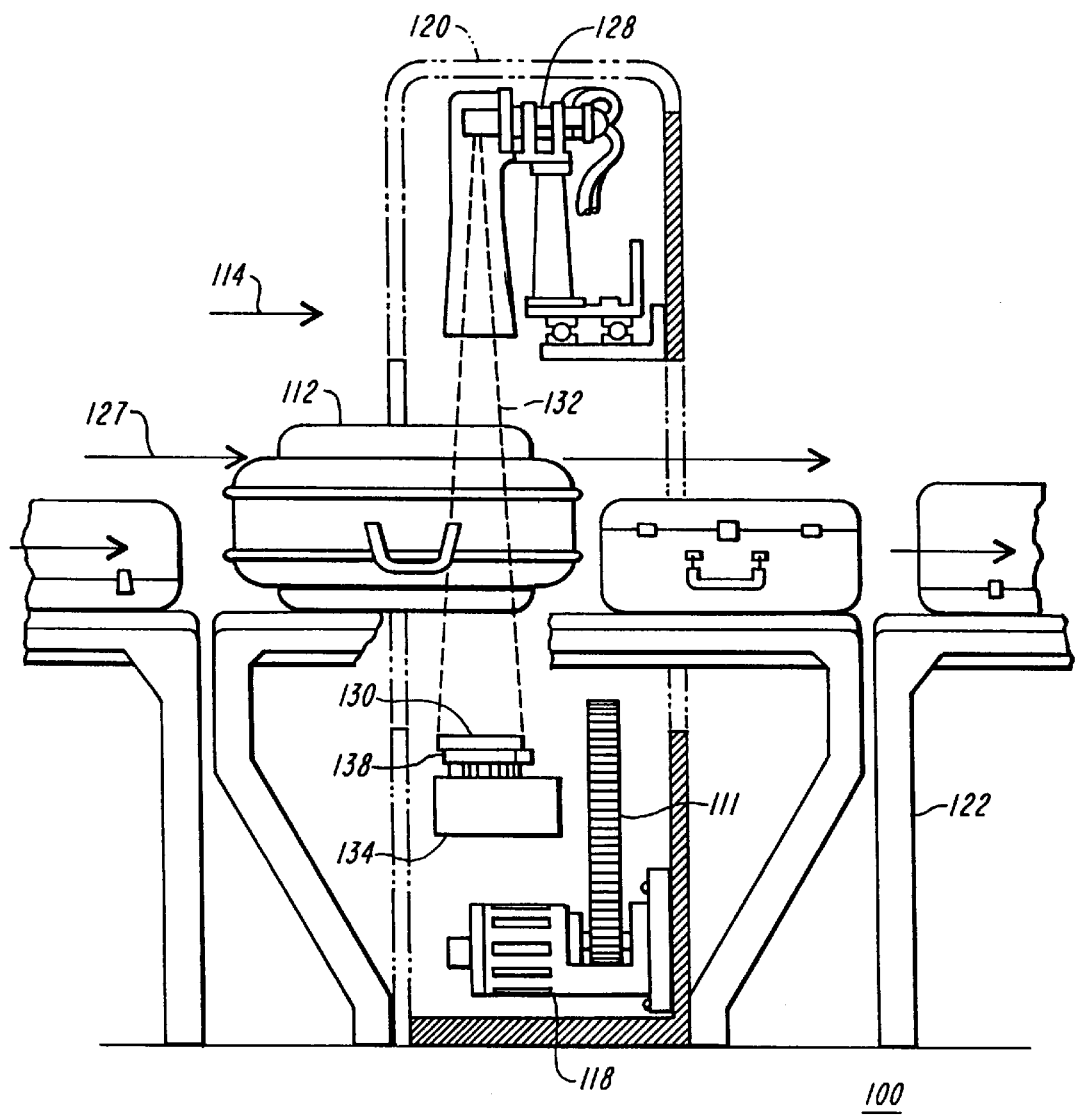
FIG. 3 contains a cross-sectional radial view of the system shown in FIG. 1.

FIGS. 1, 2 and 3 show perspective, end cross-sectional and radial cross-sectional views, respectively, of a baggage scanning system 100 constructed according to the invention which provides improved ability to detect the presence of target materials such as sheet explosives regardless of their orientation, and which also provides rapid and complete CT baggage scanning so that the system 100 reliably scans the bags at a relatively high rate with a high probability of detecting target material. The system 100 includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," (Attorney Docket No. ANA-30CON) which is assigned to the present assignee and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 can be a two-dimensional array such as the array described in a copending U.S. Patent Application entitled, "Area Detector Array for Computed Tomography Scanning System," (Attorney Docket No. ANA-137) filed on even date herewith, of common assignee, and incorporated herein in its entirety by reference. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. The X-ray tube control system 136 can be a dual energy X-ray tube control system such as the dual energy X-ray tube control system described in the above-referenced U.S. patent application Ser. No. 08/671,202 since dual energy X-ray techniques for energy-selective reconstruction of X-ray CT images are particularly useful in indicating a material's atomic number in addition to indicating the material's density, although it is not intended that the present invention be limited to this type of control system. System 120 also includes shields 138, which may be fabricated from lead, for example, for preventing radiation from propagating beyond gantry 125.

In one embodiment, the X-ray tube 128 generates a pyramidically shaped beam, often referred to as a "cone beam," 132 of X-rays that pass through a three dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the baggage is continuously transported through central aperture 126 by conveyor system 110 so as to generate a plurality of projections at a corresponding plurality of projection angles.

In a well known manner, signals from the detector array 130 can be initially acquired by data acquisition system 134, and subsequently processed by a computerized system (not shown) using CT scanning signal processing techniques. The processed data can be displayed on a monitor, and/or can also be further analyzed by the computerized system to determine the presence of a suspected material. For example, the data can be received to determine whether the data suggests the presence of material having the density (and when a dual energy system is used, molecular weight) of sheet explosives. If such data are present, suitable means can be provided for indicating the detection of such material to the operator or monitor of the system, for example, by providing an indication on the screen of a monitor 140, by sounding an audible or visual alarm, and/or by providing an automatic ejection device for removing the suspect bag from the conveyor for further inspection, or by stopping the conveyor so that the suspect bag can be inspected and/or removed.

As stated above, detector array 130 can be a two-dimensional array of detectors capable of providing scan data in both the directions of the X- and Y- axes, as well as in the Z-axis direction. During each measuring interval, the plurality of detector rows of the array 130 generate data from a corresponding plurality of projections and thereby simultaneously scan a volumetric region of baggage 112. The dimension and number of the detector rows are preferably selected as a function of the desired resolution and throughput of the scanner, which in turn is a function of the rotation rate of rotating platform 124 and the speed of conveying system 110. These parameters are preferably selected so that in the time required for a single complete rotation of platform 124, conveying system 110 advances the baggage 112 just enough so that the volumetric region scanned by detector array 130 during one revolution of the platform is contiguous and non-overlapping with (or partially overlapping with) the volumetric region scanned by detector array 130 during the next revolution of the platform.

Conveying system 110 continuously transports a baggage item 112 through CT scanning system 120, preferably at constant speed, while platform 124 continuously rotates at a constant rotational rate around the baggage items as they pass through. In this manner, system 120 performs a helical volumetric CT scan of the entire baggage item. Baggage scanning assembly 100 preferably uses at least some of the data provided by the array 130 and a helical reconstruction algorithm to generate a volumetric CT representation of the entire baggage item as it passes through the system. In one embodiment, the system 100 performs a nutating slice reconstruction (NSR) on the data as described in copending U.S. patent application Ser. No. 08/831,558, filed on Apr. 10, 1997, entitled, "Nutating Slice CT Image Reconstruction Apparatus and Method," (Attorney Docket No. ANA-118) of common assignee, and incorporated herein by reference. The system 100 thus provides a complete CT scan of each bag, rather than only providing CT scanning of selected portions of baggage items, without the need for a pre-screening device. The system 100 also provides rapid scanning since two-dimensional detector array 130 allows the system 100 to simultaneously scan a relatively large portion of each baggage item with each revolution of the platform 124.

Figure 4:
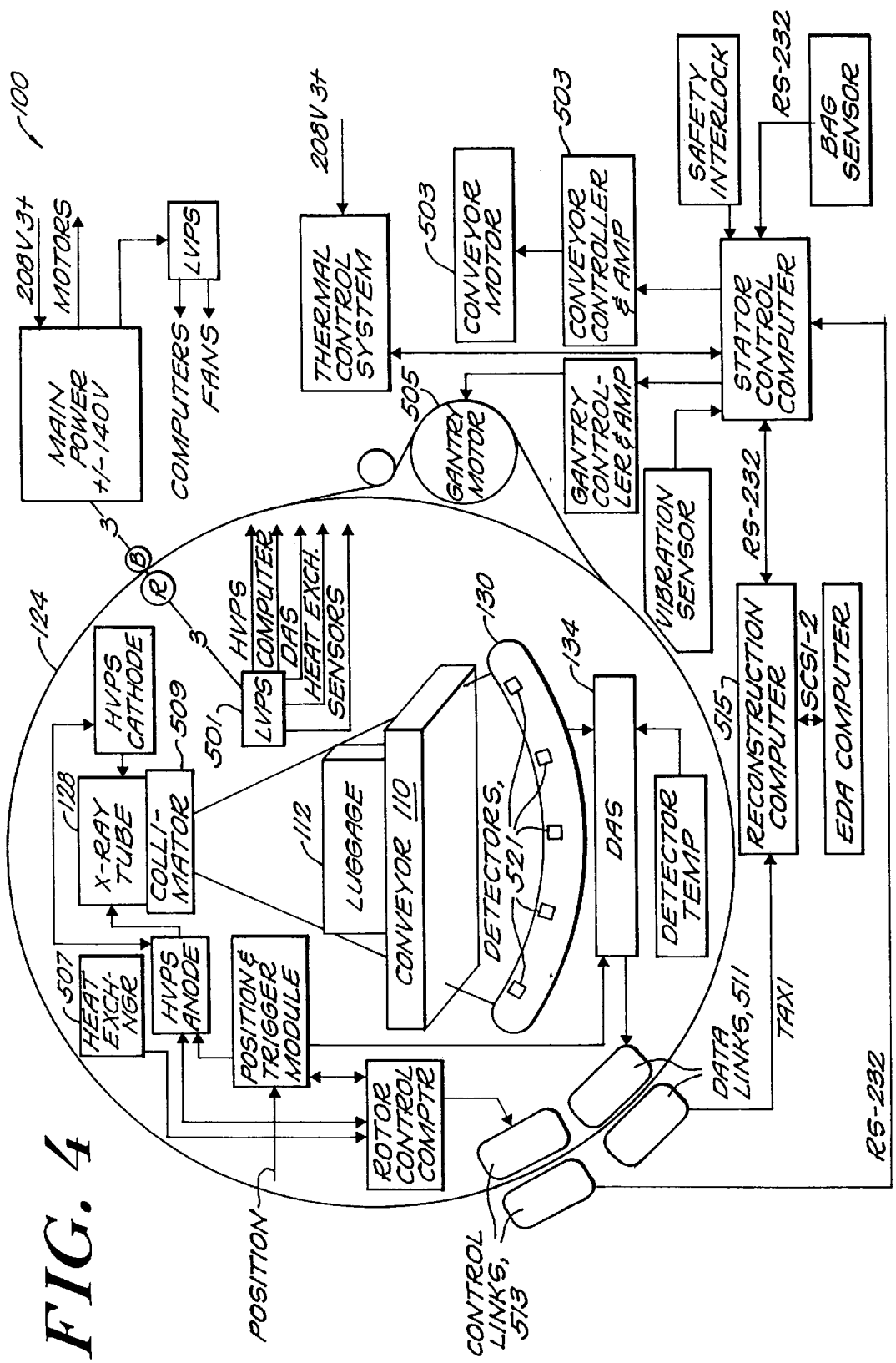
FIG. 4 contains a schematic electrical and mechanical block diagram of one embodiment of the baggage scanner of the invention.

FIG. 4 contains a mechanical/electrical block diagram of one embodiment of the baggage scanning system 100 of the invention. The mechanical gantry of the scanner 100 includes two major components, the disk 124 and the frame (not shown). The disk 124 is the rotational element which carries the X-ray assembly, the detector assembly 130, the data acquisition system (DAS) 134, a high-voltage power supply and portions of the monitor/control assembly, the power supply assembly and the data link assembly. The frame supports the entire system 00, including the baggage handling conveyor system 110. The disk 124 is mechanically connected to the frame via a duplex angular contact ball bearing cartridge. The disk 124 can be rotated at a constant rate by a belt which can be driven by a DC servomotor 505. The gantry also contains X-ray shielding on the disk and frame assemblies.

In one embodiment, the baggage conveyor system 110 includes a single belt driven at a constant rate to meet specified throughput requirements, which, in one embodiment, include a requirement that 675 bags per hour be processed. The belt can be driven by a high-torque, low-speed assembly to provide a constant speed under changing load conditions. A low-attenuation carbon graphite epoxy material can be used for the portion of the conveyor bed in the X-ray. The total length of the conveyor is designed to accommodate three average length bags. A tunnel is used around the conveyor to meet the appropriate safety requirement of a cabinet X-ray system.

In one embodiment, input power of 208 volts, 3-phase, 30 amps services as the main supply which can provide power for the entire system. This input power can be supplied by the airport at which the system is installed. Power is transferred from the frame through a series of frame brushes which make continuous contact with the metal rings mounted to the disk 124. The low-voltage power supply 501 on the disk 124 provides power for the DAS 134, the X-ray cooling system and the various monitor/control computers and electronics. A low-voltage power supply on the frame provides power for the reconstruction computer and the various monitor/control electronics. The conveyor motor 503, the gantry motor 505, the high-voltage power supply and the X-ray coolant pump can all be supplied power directly from the main supply.

The high-voltage power supply provides power to the X-ray tube 128. The supply can provide a dual voltage across the cathode/anode which can be modulated at 540 Hz. The driving waveform can be in the form of a sine wave. This supply can also provide X-ray filament power. The supply current can be held approximately constant for both voltages.

The X-ray assembly includes a bipolar, fixed-anode X-ray tube 128, a heat exchanging system 507, a collimator 509, shielding, an X-ray sensor and an alignment/mounting plate. The collimator can provide an X-ray cone beam of 61° fan angle by 6° spread. The heat exchanging system 507 includes a pump, radiator, fan and plumbing. The heat transfer liquid can be a high-dielectric oil. An alignment plate can be used for mounting the tube 128 to the disk 124 to reduce the field replacement complexity and time. An X-ray sensor can be included to provide X-ray intensity feedback.

The dual-energy X-rays strike the baggage, and some portion of the X-rays pass through and strike the detector assembly 130. The detector assembly 130 can be made up of scintillators, photodiodes, mounting substrates, anti-scatter plates and a mechanical mounting spine. A spine heater with temperature sensors 521 can also be included. The detector assembly 130 performs an analog conversion from X-ray to visible photons and then to electrical current. The anti-scatter plates can be made of high-atomic-number material and are angled at the X-ray source to reduce the amount of scattered radiation that strikes the scintillators. The scintillators are made from cadmium tungstate crystal which is thick enough to almost completely absorb all of the X-rays. The scintillators convert the X-rays into visible photons. The crystal can be surrounded on all sides except the bottom by optically reflective material. Thus, the visible photons can pass out of the bottom of the crystal. The photodiodes can be connected to the bottom of the crystal by means of an optically transmissive adhesive. The photodiodes emit a current which decreases logarithmically with the bag's X-ray attenuation. The photodiodes can be attached to a ceramic substrate which can be sized to fit several detectors.

This electrical substrate can be wire bonded and epoxied to a flexprint which contains a connector which mounts to the DAS 134. Each detector substrate can then be mechanically attached to a mounting spine that has the fan beam radius and projects in the Z-direction. This spine can then be rigidly secured to the disk 124.

The DAS 134 can sample the detector currents, multiplex the amplified voltages to a set of 16-bit analog-to-digital converters and multiplex the digital outputs to the non-contact serial data link 511. The DAS 134 can be triggered by the angular position of the disk 124.

The non-contact links 511 and 513 transfer the high-speed digital DAS data to the image reconstruction processor 515 and low-speed monitor/control signals back and forth between the disk and frame control computers. The data link 511 can be based upon an RF transmitter and receiver. The transfer protocol can be TAXI™ which is capable of up to 350 Mbits/sec. The control link 513 can be based on wireless LAN technology, which can include identical PCMCIA cards mounted in both the frame and disk computers. The cards can have both a transmitter and receiver electronics and can emulate a standard Ethernet card. A point-to-point network is therefore established for the low-speed monitor and control communication.

The image reconstructor converts the digital line integrals from the DAS 134 into a set of two-dimensional images of bag slices for both the high and low energies. The CT reconstruction can be performed via a helical-cone-beam solution. The reconstructor can include embedded software, a high-speed DAS port, an array processor, a DSP-based convolver, an ASIC-based backprojector, image memory, UART control port, and a SCSI output port for image data. The array processor can perform data corrections and interpolation. The reconstructor can be self-hosted and can tag images based upon the baggage information received over the UART interface to the frame computer.

The monitor and control system can be a PC-based embedded control system. All subsystems can be monitored for key health and status information. This system can also control both motion systems, can sense baggage information, can control the environment, e.g., temperature, humidity, etc., can sense angular position of the disk 124 and can trigger the DAS and HVPS. This system can also have a video and keyboard interface for engineering diagnostics and control. Additionally, a control panel can be included for field service.

The CT baggage scanner of the invention includes the ability to tailor the image reconstruction window to the bag being scanned in order to improve the baggage throughput of the system. Before reconstructing an image of the bag, the system of the invention can distinguish pixels to be reconstructed to generate the image of the object from pixels which are not to be reconstructed. The reconstructed pixels are those related to the density of the bag being scanned. Pixels that are unrelated to the bag are not reconstructed and are therefore effectively discarded. The discarded pixels include pixels for the region under the conveyor as well as regions next to and above the bag. By omitting a substantial number of pixels from the reconstruction process, processing time is reduced and, as a result, baggage throughput is increased.

Figure 5:
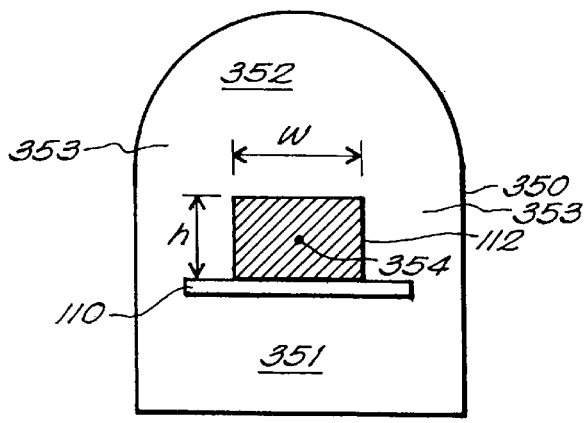
FIG. 5 is a schematic pictorial diagram of the field of view of the baggage scanner of the invention showing a bag located on the conveyor system within the field of view.

FIG. 5 is a schematic pictorial diagram of the field of view 350 of the scanner, used to illustrate the adaptive reconstruction window of the invention. The field of view 350 is shown to include the conveyor 110 on which is located a bag 112 having a height h and a width w. The field of view also includes a region 351 below the conveyor 110, a region 352 above the bag 112 and regions 353 on opposite sides of the bag 112. These regions 351, 352 and 353 are scanned by the system of the invention, and scan data is acquired for them. However, since the bag 112 is not located in these regions, image pixels for these regions contribute no information concerning the bag and are therefore discarded from the image reconstruction process for the bag.

Figure 6:
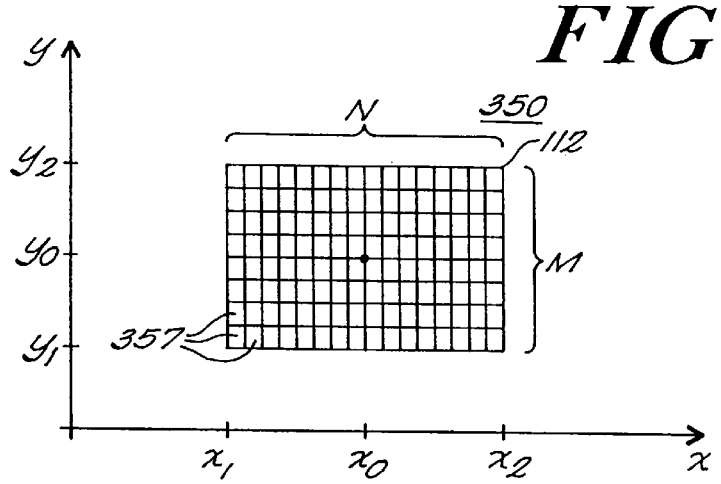
FIG. 6 is a schematic plot illustrating the field of view of the baggage scanner of the invention superimposed on a Cartesian coordinate system.

FIG. 6 is a schematic plot showing the field of view 350 of the scanner superimposed on an x,y Cartesian coordinate system. An image of the bag 112 being scanned can be regarded as being generated from a rectangular array of pixels 357. The bag can be regarded as being N pixels wide and M pixels high, and each pixel can be considered as having equal height and width dimensions of p, typically measured in millimeters. Hence, the width w of the bag 112 is given by w=Np, and the height h of the bag 112 is given by h=Mp. By determining the actual height and width of a bag being scanned, the number of pixels 357 to be reconstructed, given by N×M, can be calculated. The location of the pixels to be reconstructed can also be determined by locating the center of the bag, located at coordinate $x_0,y_0$.

The height h, width w and center $x_0,y_0$ are determined by locating the boundaries of the bag 112. As shown in FIG. 6, the bottom and top of the bag are given by coordinates $y_1$ and $y_2$, respectively, and the left and right edges of the bag are identified by coordinates $x_1,x_2$, respectively. The center 354 is identified by $x_0,y_0$, where $x_0=(x_2-x_1)/2$ and $y_0=(y_2-y_1)/2$. The height h is given by $h=y_2-y_1$, and the width w is given by $w=x_2-x_1$. The number N of pixel columns and the number M of pixel rows are then determined from the width w and height h, respectively, using the known pixel dimension p.

With the height, width and location of the bag determined, the total number of pixels N×M can be calculated as described above. In one embodiment, this total number of pixels is reconstructed to produce an image of the bag. In another embodiment, to ensure acceptable and controllable baggage throughput, pixel reconstruction is limited to a preset maximum number of pixels to be reconstructed. The desired system baggage throughput is used to determine this maximum number of pixels to be reconstructed for every bag. In one embodiment, this maximum number of pixels is set at 25,000. The total number of pixels N×M required to reconstruct an image of the bag is compared to this preset pixel limit. If N×M is less than the limit, then the N×M pixels are reconstructed. However, if N×M exceeds the limit, then the reconstruction window used for the particular bag is fit to the best possible pixel window that complies with the limit. Reconstruction is then performed on the limited number of pixels.

As described above, the height, width, center location and pixel dimensions N and M are derived from the boundary locations of the bag within the field of view of the scanner. The boundaries can be located by any of several possible methods. In one embodiment, the scan data itself is analyzed to locate the boundary locations $x_1$, $x_2$, $y_1$, and $y_2$. This can be done by examining parallel projection data generated from the scan data. In another embodiment, a separate sensor on the scanning machine is used to detect the bag boundaries.

Figure 7:
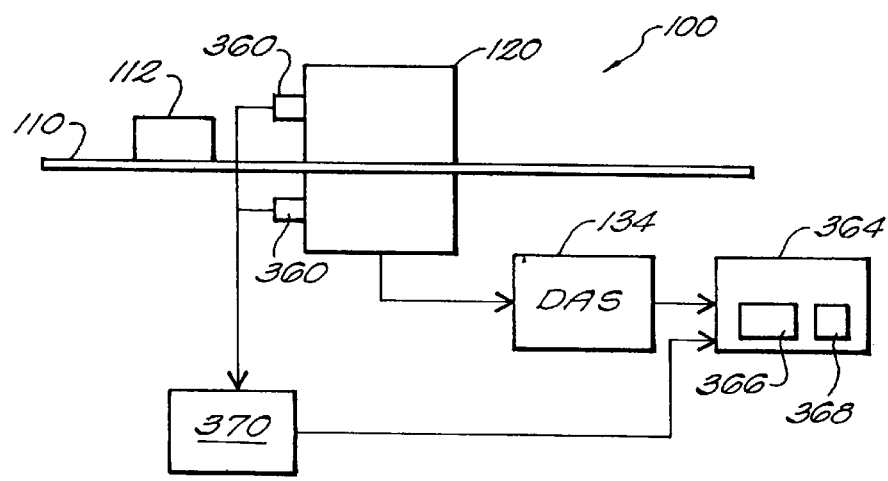
FIG. 7 is a simplified schematic block diagram of one embodiment of the baggage scanning system of the invention using sensors to identify boundaries of a bag.

FIG. 7 contains a simplified schematic block diagram of one embodiment of the baggage scanning system 100 of the invention which uses separate sensors to determine the boundaries of a bag. The system 100 shown in FIG. 7 includes the CT scanner 120 and conveyor system 110 which carries bags 112 through the scanner 120. One or more sensors 360 which can be mounted to the scanner 120 are used to detect the boundaries of the bag 112 as it enters the scanner 120. The sensors 360 can include a configuration of one or more lasers and photodetectors to detect boundaries. Alternatively, the sensors 360 can include infrared detectors and/or a combination of light-emitting diodes and photodetectors to sense the boundaries. Alternatively, the sensors 360 can include high-frequency ultra sound transducers used as range finders to detect the boundaries of the bag 112.

The sensor outputs are routed to a sensor output processing circuit 370 which processes the outputs to determine the boundaries of the bag. Detector signals generated by detectors in the scanner 120 are forwarded to a data acquisition system (DAS) 134 which processes the detector outputs and generates corresponding signals and forwards them to a processing system 364. The processing system 364 also receives outputs from the sensor processing circuit 370 which identify the boundaries of the bag. The processing system 364 generates image data from the detector data in order to generate an image of the bag 112.

The CT baggage scanning system of the invention also provides for calibrating the system such that compensation can be made for variations in detector responses from detector to detector. This calibration is performed by a calibration or "air" scan of the field of view of the system. In a conventional medical CT system, when the air scan is performed, all obstructions, such as the patient table, are removed from the field of view. A complete scan of the field of view is then performed and data acquired by the detectors are analyzed. In a baggage scanner, such as the scanner of the invention, obstructions in the field of view, such as the conveyor system, are not as readily removable to allow for an air scan. The system of the invention allows air scans to be performed without removing obstructions from the field of view.

Figure 8A:
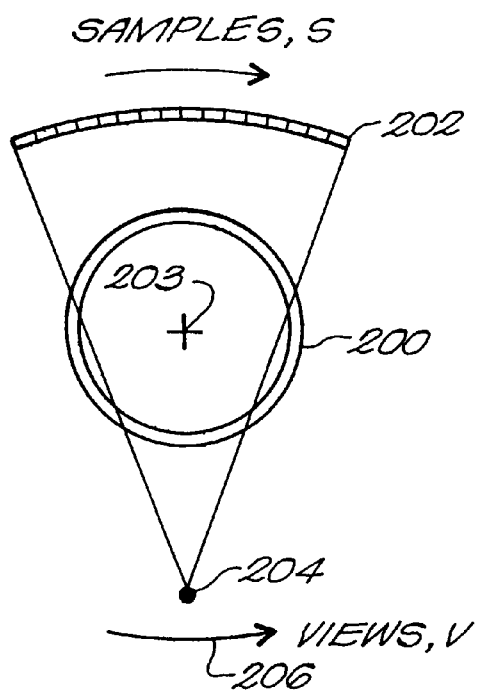
FIG. 8A is a schematic illustration of the geometric configuration of the source, detector array and field of view of a conventional CT scanner.
Figure 8B:
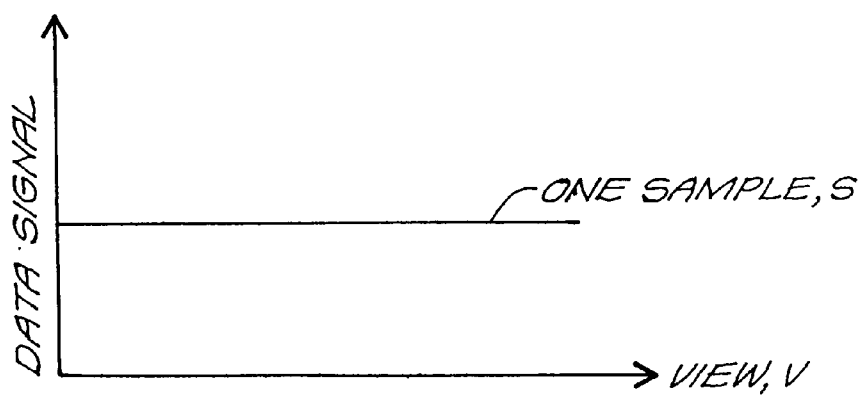
FIG. 8B is a schematic plot of a data signal obtained for a single detector during a scan of the field of view shown in FIG. 8A.

FIGS. 8A and 8B illustrate the conventional air scan. FIG. 8A schematically illustrates the configuration of the conventional CT scanner. The scanner includes a source 204 and detector array 202 which simultaneously rotate about a center of rotation 203 in a counterclockwise direction as illustrated by arrow 206. The source 204 and detector array 202 can be regarded as rotating through a series of views v about the center of rotation. At each view v, a series of samples s corresponding to the detectors in the array 202 is acquired. Typically, the field of view includes a circular window 200 which is semi-transparent to x-rays from the source 204.

FIG. 8B is a schematic plot of the data signal obtained for a single detector or sample s over the entire range of views v. As shown, because obstructions are removed from the field of view and because the window 200 is circular and therefore presents a constant density over all views, the data signal received for each detector over all views is, in general, constant. In a conventional air scan, a data set such as the one plotted in FIG. 8B is obtained for each detector in the array 202. A calibration factor is computed for each detector such that, when the factor is applied to the detectors, their responses are all equal.

In this ideal conventional situation, since the data signals for each detector do not vary with view, the calibration factor computed for each detector is view-independent. That is, the calibration factor applied to the data gathered by a detector is the same for every view at which the detector gathers data. As a result, each detector is associated with only a single calibration factor. In reality, however, the response of the detector is not exactly independent of view. Because of gravitational and other effects, the line plotted in FIG. 8B is not actually flat. Accordingly, the calibration factor is dependent upon view. Therefore, for each detector, a calibration factor is computed for each view, resulting in a large calibration look-up table, which consumes considerable memory space.

Figure 9A:
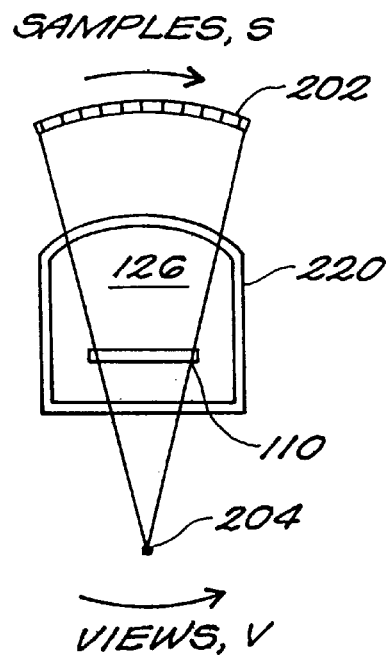
FIG. 9A is a schematic illustration of the geometric configuration of one embodiment of the baggage scanner of the present invention.
Figure 9B:
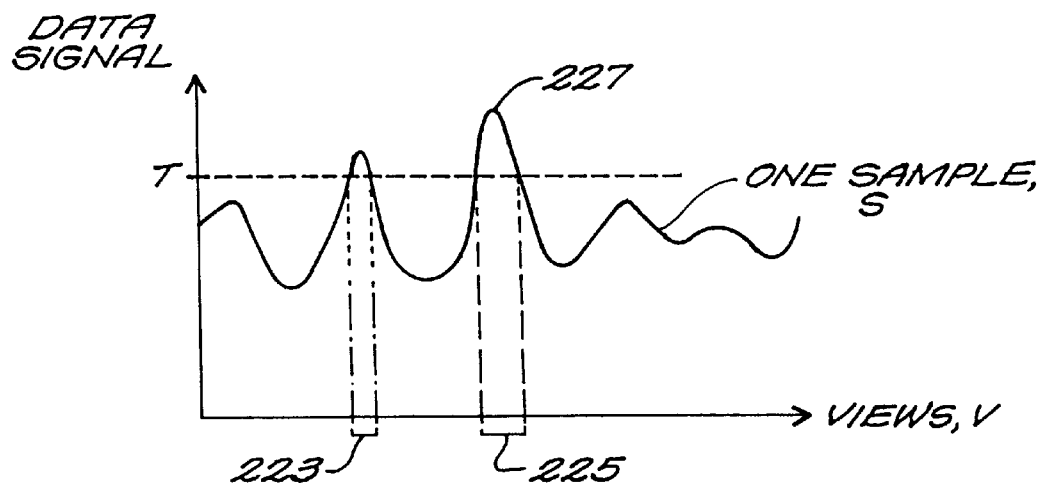
FIG. 9B is a schematic plot of a data signal obtained for a single detector during a scan of the field of view of FIG. 9A.

FIG. 9A schematically illustrates the scanning configuration of the baggage scanner system 100 of the present invention. As shown in FIG. 9A, the configuration differs from the conventional configuration shown in FIG. 8A. In the baggage scanner 100, the conveyor system 110 is present in the field of view and remains as an obstruction in the field of view during an air calibration scan. Also, the machine aperture 126 is not circular as is the aperture in the conventional machine. The machine of the invention can also include a window 220 which is not circular, in contrast to the circular window 200 in the conventional scanning system. These factors combine to produce a detector response during an air scan which is dependent upon view, as shown in FIG. 9B, which is a plot of the data signal generated by a single detector or sample s over all views v during an air calibration scan of the field of view of the baggage scanner of the invention. It will be understood that the shape of the curve shown in FIG. 9B is merely illustrative of an uneven view-dependent detector response and is not intended to accurately represent the actual response of any detector.

To perform an effective air calibration scan, it is desirable to use only views associated with rays that do not pass through an obstruction. In the present invention, the data illustrated by FIG. 9B for each detector are analyzed and data associated with unobstructed rays are selected for use in computing the calibration adjustment for the detector. In one embodiment, this is accomplished by setting a detector signal threshold T and processing data values according to where they fall with respect to T. The threshold T can be set such that data values above the threshold T can be assumed to be generated by unobstructed rays passing through the field of view. The calibration factor can then be computed using only those data values that exceed the threshold T.

For example, as shown in FIG. 9B, two ranges of views 223 and 225 generate data values above the threshold T. It is these views that are assumed to be generated from unobstructed ray paths through the field of view of the given detector sample s. Therefore, only the data values generated in these two ranges of views are used to compute the calibration factor for this detector. In one embodiment, the data values above the threshold T are averaged and the average value is used to determine the calibration factor for that detector or sample s. This results in a single calibration factor being determined for the detector, and this single calibration factor can be used for all data gathered by the detector over all views. That is, the calibration is view-independent.

Hence, even though the response of the detector, due to obstructions in the field of view, is dependent upon view, the invention distinguishes obstructed views from unobstructed views, and as a result, generates a view-independent calibration for the detector. This saves substantial memory and computation in both storing the calibration factors and in adjusting the data values during subsequent scans of actual objects.

During actual scans, scan data are normalized to account for the calibration factor computed for each detector during the air calibration scan. For each projection over every view and sample, a normalized value can be computed according to $P_{vs} = \ln(A_{vs}/D_{vs})$, where $P_{vs}$ is the projection data at a particular view v and detector sample s, $A_{vs}$ is the calibration factor obtained during calibration at the view v and sample s, and $D_{vs}$ is the actual data gathered at view v by detector sample s. It should be noted that, as described above, $A_{vs}$ is the same over all v, in one embodiment.

The threshold T can be computed by several different approaches. In one approach, the maximum data value, indicated by reference numeral 227 in FIG. 9B, can be multiplied by a constant factor to compute the threshold T. Preferably, the factor is a fraction slightly less than 1, e.g., 0.95. Such a relatively high threshhold is selected to provide a high level of confidence that only data values associated with unobstructed rays are used in the computation of the calibration factor.

Figure 10:
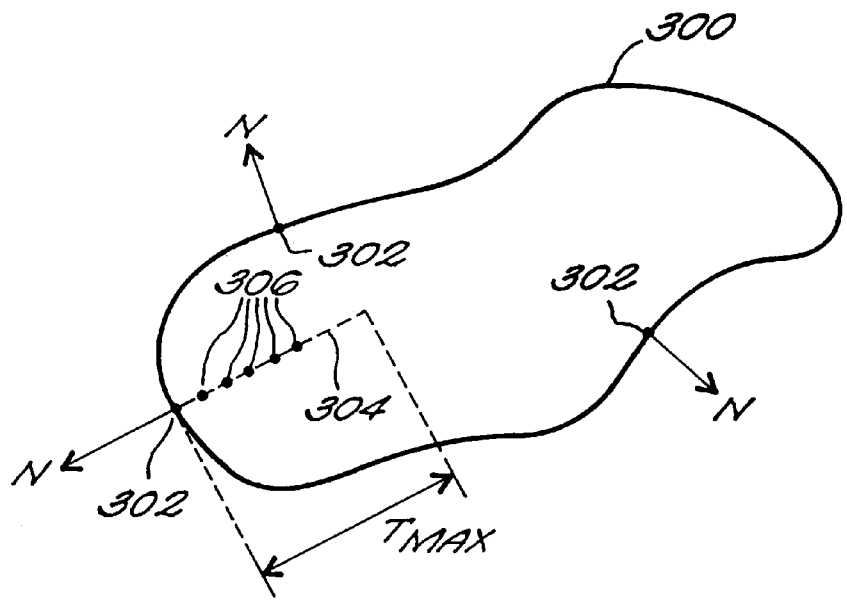
FIG. 10 is a schematic illustration of a three-dimensional CT image of a three-dimensional object.

The present invention also includes an apparatus and method for detecting the shape of an object, particularly sheet-shaped objects, in the three-dimensional CT image data for an object. It is assumed that the object is defined by boundaries or an outside surface and that each pixel in the image is representative of density of the object at that pixel. FIG. 10 is a schematic illustration of a three-dimensional CT image of an object 300. For ease of illustration, the object 300 is shown in two dimensions. However, it will be understood that the invention applies to three-dimensional objects.

In accordance with the invention, a series of points 302 along the surface of the object 300 is identified and analyzed. Given the pixels that define the surface in three-dimensional space, a surface normal vector N at any given location can be determined such as by computing the gradients of the surface. At each point 302, a surface normal vector N is identified. For each normal N, a normal line 304 is projected back into the object 300. A series of points 306 along the normal line 304 are then identified, and a density value from the CT data for the object is assigned to each of the data points 306. To determine the density at each point 306 along the normal line 304, interpolation between pixel values can be used. A maximum thickness $T_{MAX}$ is set to define the maximum distance along the normal line 304 that data points 306 will be computed. The maximum thickness $T_{MAX}$ is chosen to be larger than the maximum expected thickness of a sheet.

Figure 11:
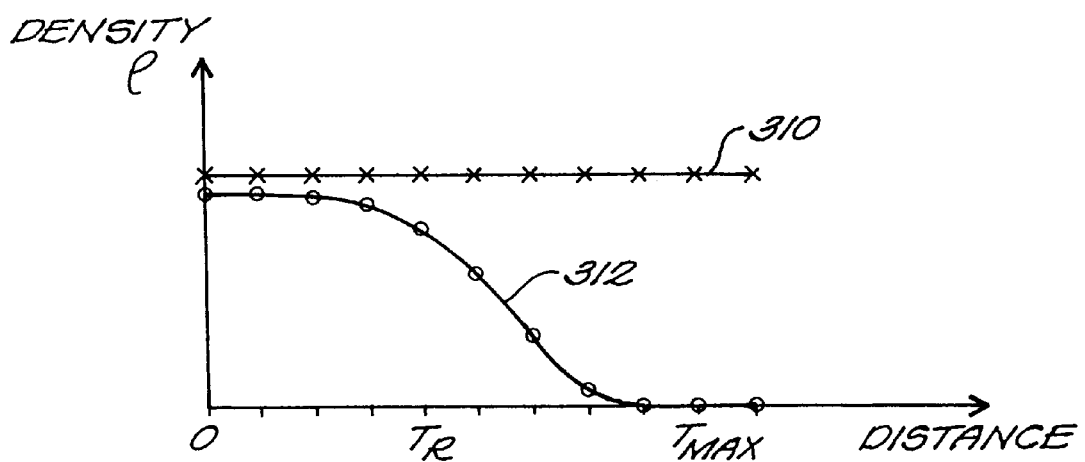
FIG. 11 is a schematic plot of density distributions along surface normal lines of CT images of a thin object and a thick object.

The density distribution of the points 306 along the normal line 304 is determined and analyzed. FIG. 11 shows sample distributions for two cases of data points 306 along a surface normal 304. In one distribution, labeled 310, the density ρ is relatively constant into the object 300 out to and beyond the maximum measured thickness $T_{MAX}$. In the distribution labeled 312, the density function rolls off at some distance $T_R$. This roll-off distance $T_R$ is indicative of the thickness of the object 300 at the associated surface normal line 304. Hence, at that particular surface normal N, the object 300 is relatively thin. Where there is no roll-off, as shown by curve 310, the object at the associated point 302 is relatively thick. In fact, it is at least as thick as the preset maximum thickness $T_{MAX}$.

This process is repeated for a plurality of locations 302 along the surface of the object 300, and a distribution such as that shown in FIG. 11 is analyzed such that a value for $T_R$ is assigned to each surface normal N. The value of $T_R$ can be the point along the curve at which the density rolls off, such as shown in FIG. 11. Alternatively, the value of $T_R$ can be computed as the mean of the curve 312 for the associated surface normal N. In cases where the distribution does not roll off, such as is shown by curve 310, $T_R$ is set to the maximum thickness $T_{MAX}$.

Figure 12A:
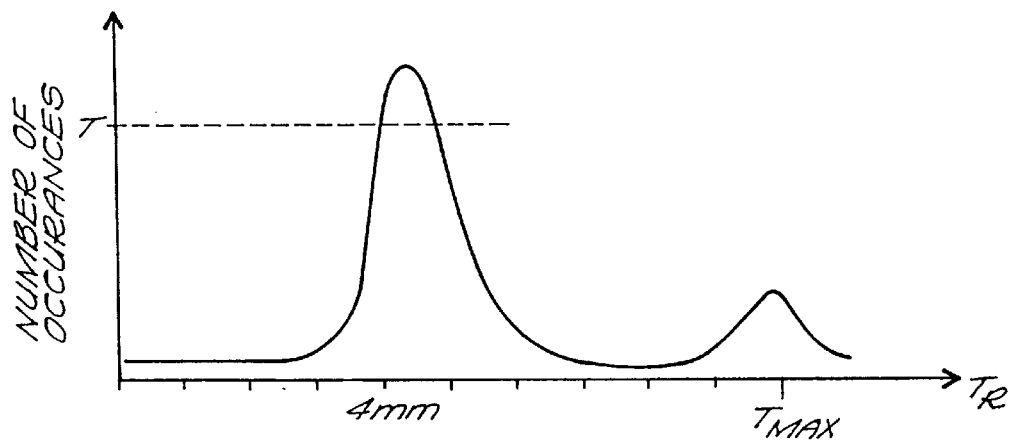
FIG. 12A is a schematic plot of a histogram of density roll-off distances for a thin object.
Figure 12B:
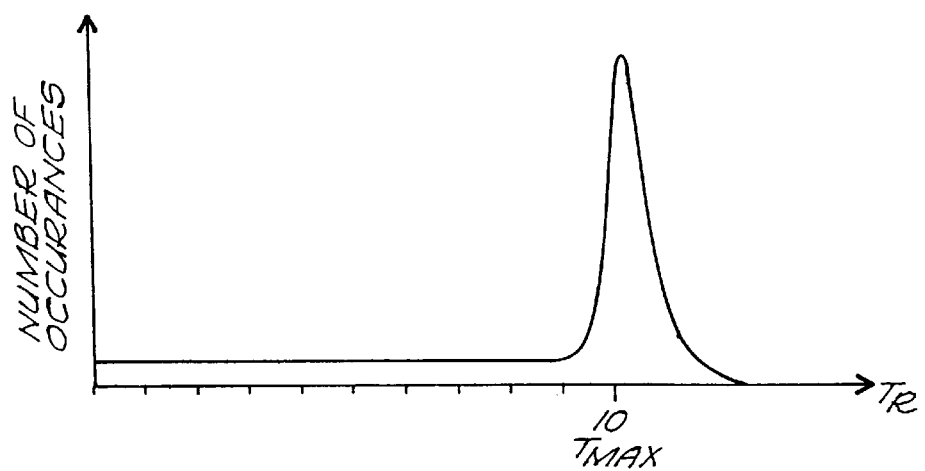
FIG. 12B is a schematic plot of a histogram of density roll-off distances for a thick object.

A histogram can then be generated for all of the $T_R$ values, as shown, for example, in FIGS. 12A and 12B. FIG. 12A shows a histogram in which the object 300 can be concluded to be a sheet. In this example, $T_{MAX}$ is set to 10 mm and a peak in the histogram occurs at about 4 mm. This indicates that a large portion of the roll-off values $T_R$ for points 302 along the surface are at 4 mm. With such a large portion of thicknesses being substantially below the maximum $T_{MAX}$, it can be concluded that the object 300 is a sheet.

To analyze the histogram, a threshold T can be set. If a peak in the curve exceeds the threshold, as shown in FIG. 12A, then it can be concluded that the peak indicates a sheet having a thickness at the location of the peak along the horizontal axis, e.g., 4 mm. The small rise in the curve at $T_{MAX}$ (10 mm) indicates that a substantial number of measurements showed thicknesses beyond the maximum thickness $T_{MAX}$. This is mostly due to measurements taken along the thin edge of the sheet which tend to indicate high densities extending deep into the object. But, the peak at 4 mm is so much higher than the rise at 10 mm that, statistically, a sheet is indicated.

FIG. 12B shows a histogram produced for the case in which the object 300 is not a sheet. As shown in FIG. 12B, there is a peak in the histogram at the maximum thickness $T_{MAX}$ (10 mm), which indicates that a large portion of the measurements show a thickness which exceeds the maximum thickness expected for a sheet. Hence, it can be concluded that the object 300 is not a sheet. The method of truncating the distribution at $T_{MAX}$ decreases processing time and eliminates computational problems associated with the surface normals along the edge of a sheet.

In one embodiment, the statistical analysis can be performed automatically on a processor. The histogram can be automatically searched for peaks. The location and shape of a peak can determine if the object is a sheet by comparison with an existing dataset or a database.

The CT scanning system of the invention also has the ability to compensate for temperature-dependent "dark current" detector offset currents or, simply, "offsets." A dark current is a current generated by a detector with the x-ray source turned off, i.e., while the detector is not receiving x-rays. This residual or quiescent current can cause inaccuracies in the scan data obtained during normal object scanning. Adding to the inaccuracies introduced by dark currents is the fact that they are also dependent upon temperature and may vary from detector to detector. An adjustment is calculated to compensate for the dark current offsets to reduce these inaccuracies.

In the present invention, temperature-dependent offsets can be calculated for each detector. In one embodiment, a calibration procedure is performed before actual scanning to characterize the temperature dependence of the offsets. During the calibration procedure, currents from the detectors are measured while the temperature of the detectors is cycled. Plural data points, i.e., offset versus temperature, are obtained for plural detectors. In one embodiment, data points are obtained for each detector. In another embodiment, only a subset of all the detectors is used. An average of the offsets can then be used for each detector.

After the temperature dependence characterization is obtained, actual scanning can be performed. A temperature sensor mounted in proximity to the detectors senses the temperature of the detectors as scanning is performed. Comparing the present temperature to the stored temperature dependence function identifies an offset to be applied to the data obtained by the scanning detectors. In one embodiment, periodic scans with the X-ray source turned off are performed between bags. These periodic dark current scans are performed at a known temperature $T_1$. Later, when actual scans are performed, the temperature $T_2$ is sensed. The difference between the dark current scan temperature $T_1$ and the present scanning temperature $T_2$ is applied to the stored temperature dependence function obtained during the calibration procedure to identify an appropriate offset to be applied to the detector data.

To illustrate the temperature dependent offset function of the invention, let x be the temperature dependent offset of a single channel under consideration. The temperature dependence of the offset is given by the following Taylor series expansion:

$$x(T) \approx \alpha_0 + \alpha_1 T + \alpha_2 T^2, \qquad (1)$$

where T is the temperature of the channel and $\alpha_i$, I=0,1,2, are constants.

The values of $\alpha_i$ are determined using the calibration procedure. Calibration of the temperature dependence of the offsets is required infrequently, perhaps only annually, or when a defective detector element is replaced. During the calibration, the temperature of the detector is varied so that the offset can be measured at a number of temperatures representative of the typical operating range of the scanner. Let $x_i$ be the offsets measured at temperatures $T_i$, where I=0,1, . . . , N–1 and N is the number of measurements. A typical value of N is five. The values of $\alpha_i$ are estimated using least square errors as follows:

Let C be a matrix of $\alpha_i$ as in:

$$C = \begin{bmatrix} \alpha_0 \\ \alpha_1 \\ \alpha_2 \end{bmatrix}. \qquad (2)$$

The matrix C is found using $$C = A^{-1} B \qquad (3)$$

where $$A = \begin{bmatrix} \langle x_i, 1 \rangle \\ \langle x_i, T_i \rangle \\ \langle x_i, T_i^2 \rangle \end{bmatrix} \qquad (4)$$

and $$B = \begin{bmatrix} \langle 1, 1 \rangle & \langle T_i, 1 \rangle & \langle T_i^2, 1 \rangle \\ \langle 1, T_i \rangle & \langle T_i, T_i \rangle & \langle T_i^2, T_i \rangle \\ \langle 1, T_i^2 \rangle & \langle T_i, T_i^2 \rangle & \langle T_i^2, T_i^2 \rangle \end{bmatrix} \qquad (5)$$

and where $$\langle \alpha_i, \beta_i \rangle = \sum_{i=0}^{N-1} \alpha_i \beta_i \qquad (6)$$

In the course of a scanner's operation, a detector's offset is periodically measured. During typical operation, the offset is measured hourly. Let $T_1$ be the temperature at which the offset is measured. Also let $x(T_1)$ be the offset at this first temperature. At some time later, during scanning, the detector will be at temperature $T_2$. The value of the offset at this second temperature, $x(T_2)$, follows from (1) as $$x(T_2) \approx x(T_1) + \alpha_1(T_2-T_1) + \alpha_2(T_2^2-T_1^2). \quad (7)$$

In practice, there are D detectors and the detector temperatures are measured for only a small subset of the total number D of detectors. Let N be the number of temperature readings, where a typical value might be five. The temperature readings are taken by temperature sensors such as, for example, the five temperature sensors 521 shown in FIG. 4. Let $d_i$ be the detectors at which the temperatures are measured, where I=0,1, . . . , N−1, where, again, N is the number of temperature readings. Let $T_{di}$ be the measured temperatures at detectors $d_i$. The temperature $T_j$ at detector j, where j=0,1, . . . , D−1, can be estimated by fitting a second-order polynomial through the N readings. The parametric form for the temperature dependence is $$T_j \beta_0 + \beta_1 j + \beta_2 j^2, \quad (8)$$

where $\beta_i$ are constants that can be determined via least squares errors as follows:

Let $$F = \begin{bmatrix} \beta_0 \\ \beta_1 \\ \beta_2 \end{bmatrix} \quad (9)$$

The matrix F is found using $$F = D^{-1} E \quad (10)$$

where $$D = \begin{bmatrix} \langle T_{di}, 1 \rangle \\ \langle T_{di}, d_i \rangle \\ \langle T_{di}, d_i^2 \rangle \end{bmatrix} \quad (11)$$

and $$E = \begin{bmatrix} \langle 1, 1 \rangle & \langle d_i, 1 \rangle & \langle d_i^2, 1 \rangle \\ \langle 1, d_i \rangle & \langle d_i, d_i \rangle & \langle d_i^2, d_i \rangle \\ \langle 1, d_i^2 \rangle & \langle d_i, d_i^2 \rangle & \langle d_i^2, d_i^2 \rangle \end{bmatrix} \quad (12)$$

The temperatures at detectors $d_i$ can be measured using thermocouples and resistive temperature detectors (RTD).

While this invention has been particularly shown and described with references to preferred embodiments thereof, it will be understood by those skilled in the art that various changes in form and details may be made therein without departing from the spirit and scope of the invention as defined by the following claims.

What is claimed is:

1. In a CT scanning system having a radiation source for directing radiation through a region and an array of detectors for receiving radiation from the region while scanning the region and for generating detector signals indicative of the received radiation, a method of compensating for electrical currents that are generated by the detectors independently of radiation received by the detectors, said method comprising:

generating a calibration relationship for the array of detectors, said generating comprising:
varying the temperature of the array of detectors,
measuring the electrical currents generated by the detectors as the temperature of the detectors is varied,
characterizing the variation in the electrical currents with temperature,
using the variation in the electrical currents with temperature, generating a set of first detector offset signals to be applied to the detector signals generated while scanning the region;

after generating the calibration relationship, sensing a first temperature of the array of detectors;

measuring a first updated detector offset signal associated with the first temperature;

scanning the region to generate a detector signal;

sensing a second temperature of the array of detectors;

using the second temperature, the calibration relationship, and the first updated detector offset signal, adjusting the first updated detector offset signal to generate an adjusted detector offset signal such that the adjusted detector offset signal is based on the first updated detector offset signal, the second temperature and the calibration relationship; and applying the adjusted detector offset signal to the detector signal.

2. The method of claim 1 wherein each detector in the array of detectors is assigned a respective offset signal.

3. The method of claim 1 wherein characterizing the variation in electrical currents with temperature comprises fitting the variation to parametric equations.

4. The method of claim 1 wherein characterizing the variation in electrical currents with temperature comprises generating a least squares estimate using the detector offset signals.

5. The method of claim 1 wherein the temperature of the array of detectors is sensed by a plurality of temperature sensors disposed at a plurality of locations on the array of detectors.

6. The method of claim 5 wherein a plurality of temperature measurements made by the plurality of temperature sensors are fit to a polynomial which can be used to estimate a temperature for each detector in the array of detectors.

7. A CT scanning system comprising:

a radiation source for directing radiation through a region;

an array of detectors for receiving radiation from the region while scanning the region and for generating detector signals indicative of the received radiation; and means for compensating for electrical currents that are generated by the detectors independently of radiation received by the detectors, said means for compensating for electrical currents comprising:

means for generating a calibration relationship for the array of detectors, said means for generating (i) varying the temperature of the array of detectors, (ii) measuring the electrical currents generated by the detectors as the temperature of the detectors is varied,(iii) characterizing a variation in the electrical currents with temperature, and (iv) generating a set of first detector offset signals using the variation in the electrical currents with temperature;

means for sensing a first temperature of the array of detectors after the calibration relationship is generated;

means for measuring a first updated detector offset signal associated with the first temperature;

means for sensing a second temperature of the array of detectors;

means for adjusting the first updated detector offset signal using the second temperature, the calibration relationship and the first updated detector offset signal to generate an adjusted detector offset signal such that the adjusted detector offset signal is based on the first updated detector offset signal, the second temperature and the calibration relationship; and means for applying the adjusted detector offset signal to a detector signal to compensate for the electrical currents.

8. The CT scanning system of claim 7 the means for characterizing a variation in the electrical currents with temperature comprises a means for generating a least squares estimate using the detector offset signals.

9. The CT scanning system of claim 7 wherein each detector in the array of detectors is assigned a respective offset signal.

10. The CT scanning system of claim 7 wherein the means for characterizing a variation in the electrical currents with temperature comprises a means for fitting the variation to parametric equations.

11. The apparatus of claim 7 wherein the temperature of the array of detectors is sensed by a plurality of temperature sensors disposed at a plurality of locations on the array of detectors.

12. The apparatus of claim 11 wherein a plurality of temperature measurements made by the plurality of temperature sensors are fit to a polynomial which can be used to estimate a temperature for each detector in the array of detectors.

* * * * *